Patented Feb. 7, 1950

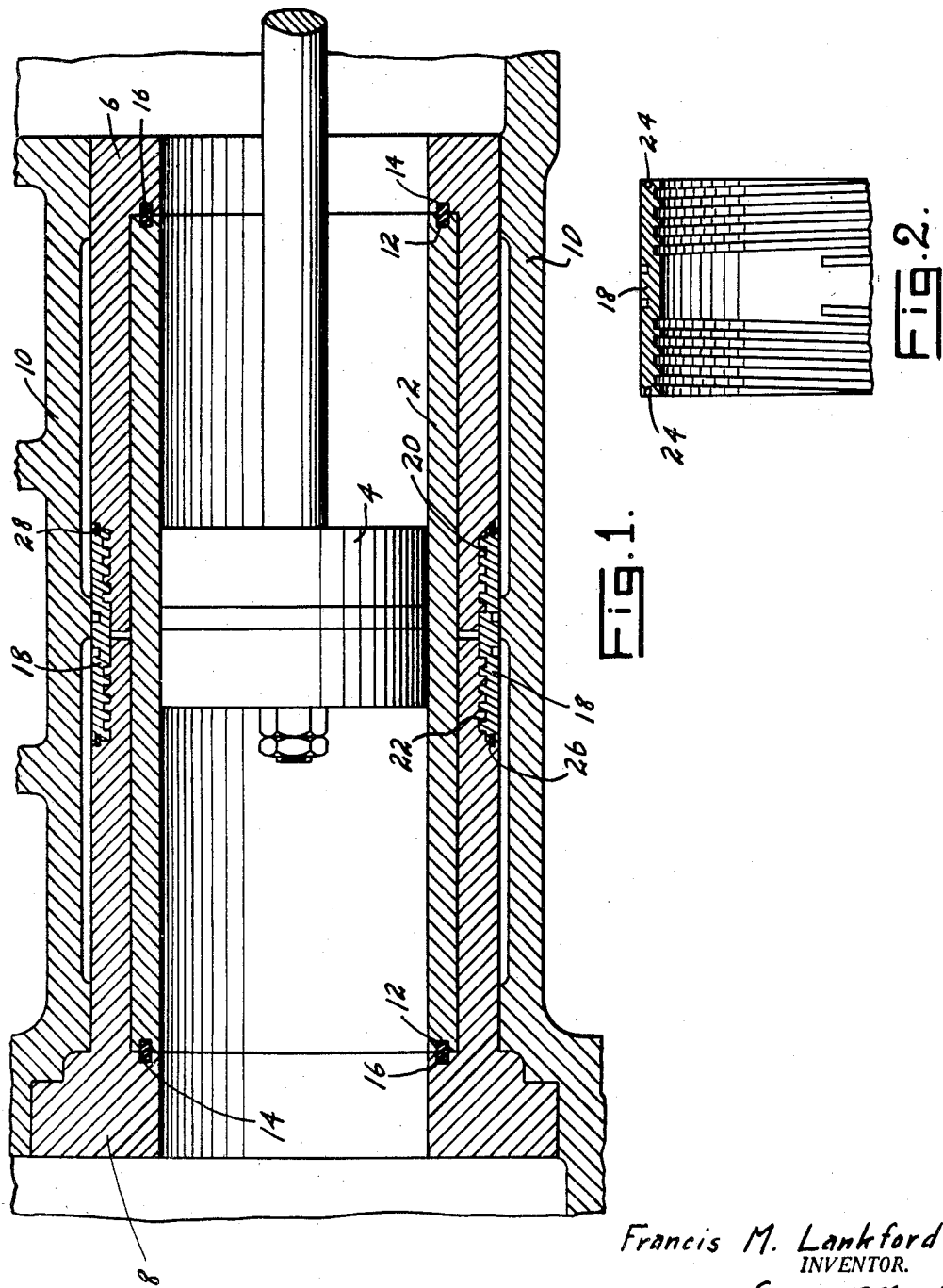

2,496,547

UNITED STATES PATENT OFFICE 2,496,547

CYLINDER LINER

Francis M. Lankford, Houston, Tex.

Application May 14, 1945, Serial No. 593,712

10 Claims. (Cl. 309—3)

This invention relates to a pump liner, and more particularly to a pump liner adapted for use in slush pumps and the like, which require an inner surface of particularly hard steel.

It is well known that hard steel is also relatively brittle and that, therefore, it must be protected or preferably encased in a softer though tougher steel casing.

It is an object of the invention to provide a pump liner having an inner portion of hard steel and surrounded with an outer shell of relatively tough steel, which liner elements may be readily secured together without the provision of close tolerance therebetween.

A further object is to provide a pump liner, the elements of which can be readily renewed when necessary because of damage, wear or the like.

It will be understood that the pump into which this liner is to be placed is conventional in form, and consequently only a small portion of the pump casing is disclosed.

In the accompanying drawings:

Fig. 1 is a cross-section through the pump casing showing the liner in its adjusted and operable position; and Fig. 2 is a partly broken away cross-section through the turnbuckle for securing together two end portions of the pump liner outer shell.

The pump liner is composed of an inner cylindrical shell 2 preferably of case hardened steel or the like to resist wear incident to pumping of the highly abrasive material which is necessary in the use of slush pumps or the like. The inner circumference of the shell 2 is adapted to fit within commercial tolerance a conventional piston 4 provided with conventional piston rings (not shown).

The inner case hardened shell 2 is adapted to be positioned within a divided pump liner outer shell which is preferably made in two divided cylindrical sections 6 and 8. These cylindrical sections 6 and 8 are preferably made of a soft but tough steel, and are shaped so that they may fit properly within a conventional pump casing 10, shown only in part. The outer liner or shell 8 is provided with a conventional flanged end so that it may be properly seated within the pump casing 10.

The two outer sections 6 and 8 of the pump liner outer shell are provided at their adjacent ends with oppositely pitched threads around which is a threaded nut or turnbuckle 18 having internal threads complementary to the above-recited threaded ends of the outer linings 6 and 8.

The internal circumference of the outer liner elements 6 and 8 is such that they may fit readily over the external circumference of the inner lining 2 of case hardened metal to fit the same relatively snugly, but not necessarily to have minute tolerance.

Suitable annular grooves 12 are made in the two opposite ends of the case hardened inner lining 2, and complementary annular grooves 14 are made in the outer casings 6 and 8. In these complementary grooves 12 and 14, preferably, a rubber ring 16 is positioned so that space between the ends of the inner liner 2 and the outer liners 6 and 8 will be bridged thereby. In assembling the pump lining, the case hardened inner liner 2 is positioned within the outer liner sections 6 and 8 which have interposed between the inner liner and the outer liners 6 and 8 a suitable rubber ring 16 positioned so that one portion of the ring 16 is engaged within the annular groove 12 in the inner liner, and the other portion is engaged within the annular groove 14 in the outer liner. The turnbuckle 18 is adapted to be turned so that its engagement with the threads 20 in the end of the outer liner 6 and the threads 22 on the adjacent end of the outer liner 8 may be drawn together.

By thus drawing the casings 6 and 8 together, they will securely hold the inner case hardened liner 2 tightly in position, and will hold the rubber ring 16 well within the annular grooves 12 and 14.

Preferably the turnbuckle 18 is provided at its ends with annular grooves 24 which are complementary to the annular grooves 26 made in the outer liner sections 6 and 8, and are adapted to hold therebetween a suitable rubber ring or packing 28.

Thus, when the liner is assembled, it will be obvious that a case hardened inner lining is provided and held in position within the outer liner sections 6 and 8 by means of turning the turnbuckle 18 and drawing sections 6 and 8 together against the rubber ring inserted in the annular grooves 12 and 14. The turnbuckle is also provided with annular grooves in both ends thereof, so that a rubber ring 28 may be positioned between those annular grooves and annular grooves 26 provided in the liner sections 6 and 8.

By this construction, the parts of the inner liner will be completely sealed, although those parts may be made without the provision of annular close tolerance therebetween and yet the sealing will completely prevent any ingress of liquid from the interior or the exterior of the liner. These sealing rings 16 and 28 need not be particularly tight in their respective grooves inasmuch as the pressure from within the pump liner will force them radially outward and provide a seal between the liner parts even though the ring does not fit tightly within the annular groove.

With this construction, it is possible to provide a suitable pump liner which may be relatively easily changed or replaced when necessary, and yet which is provided with an inner member which can be readily made of very hard though brittle material while the outer part of the liner may be made of relatively soft though tough material. Also an adequate seal is provided between the inner and outer elements of the pump liner in spite of the fact that the elements need not be carefully machined to have only minute tolerance.

I claim:

1. A pump liner comprising a divided outer shell of relatively tough metal adapted to fit within a pump housing, a hard metal inner shell positioned within the divided outer shell, and turnbuckle means drawing the outer shell parts together and enclosing the hard inner shell.

2. In a pump liner, an inner cylindrical liner of hard metal, a plurality of cylindrical support casings encasing the liner and in metal to metal contact with the liner edges, means holding the metal casings together, and resilient means interposed between the edges of the liner and the metal casings insuring a seal therebetween.

3. In a pump liner, an inner cylindrical liner of hard metal, two cylindrical support sections enclosing the hard metal liner, resilient annular packings interposed between the edges of the hard metal liner and each support section, and means holding the support sections together.

4. In a pump liner, an inner cylindrical liner of hard metal, two cylindrical support sections enclosing the hard metal liner, resilient annular packings interposed between the ends of the hard metal liner and each support section, turnbuckle means drawing the support sections together, and resilient packing means interposed between the ends of the turnbuckle and the support sections.

5. In a pump liner, an inner cylindrical liner of hard metal, two cylindrical support sections enclosing the liner, annular grooves in the edges of the liner, complementary annular grooves in the cylindrical sections, annular packing means inserted in the grooves, and means holding the cylindrical sections together.

6. In a pump liner, an inner cylindrical liner of hard metal, two cylindrical support sections enclosing the liner, annular grooves in the ends of the liner, complementary annular grooves in the cylindrical sections, annular packing means inserted in the grooves, and a turnbuckle member drawing the sections together, the turnbuckle member having annular packing rings interposed between its ends and the cylindrical sections.

7. A pump liner including an outer shell comprising two complementary annular parts of relatively tough metal adapted to fit within a pump housing, the adjacent ends of said annular parts being of larger internal diameter than the remote ends thereof, said remote ends adapted to receive the end portions of a hard metal inner shell, a hard metal inner shell positioned within said outer shell, and means holding the sections of said outer shell together to clamp the said inner shell between them.

8. A pump liner including an outer shell comprising two complementary annular parts of relatively tough metal adapted to fit within a pump housing, the adjacent ends of said annular parts being of larger internal diameter than the remote ends thereof, said remote ends adapted to receive the end portions of a hard metal inner shell, a hard metal inner shell positioned within said outer shell, and means for securing the sections of said outer shell together with said inner shell between them.

9. In a cylinder liner combination having an outer support member with a grooved seal surface to receive the end of a wear resisting cylinder, the abutting end of which has a groove registering with the groove of the outer member and means for holding the grooved cylinder edge in abutment with the seal surface of the outer member, the improvement which resides in a seal member of resilient material flowable under pressure, said seal member disposed within the space defined by the grooves and bridging the joint between the cylinder edge and seal surface, the size of the seal member being such that it is not normally under compression when assembled, whereby assembly of the combination is facilitated and in operation fluid pressure forces the seal member into sealing relation with the cylinder edge and seal surface sealing the joint therebetween.

10. In combination two members having confronting surfaces, said surfaces having registering annular grooves and a continuous seal member formed of resilient material flowable under pressure, said seal member adapted to fit within the space defined by the grooves in a manner to bridge the joint between the surfaces without being substantially compressed when the surfaces are in abutment.

FRANCIS M. LANKFORD.

REFERENCES CITED

The following references are of record in the file of this patent:

UNITED STATES PATENTS

| Number | Name | Date |
|---|---|---|
| 140,697 | Gay | July 8, 1873 |
| 661,061 | Lidback | Nov. 6, 1900 |
| 817,543 | Bole | Apr. 10, 1906 |
| 1,027,665 | Parker | May 28, 1912 |
| 1,057,741 | Keen | Apr. 1, 1913 |
| 1,584,843 | Carroll | May 18, 1926 |
| 1,592,266 | Hamer | July 13, 1926 |
| 2,345,370 | Whann et al. | Mar. 28, 1944 |

FOREIGN PATENTS

| Number | Country | Date |
|---|---|---|
| 235,620 | Great Britain | 1925 |